United States Patent Office 2,805,560
Patented Sept. 10, 1957

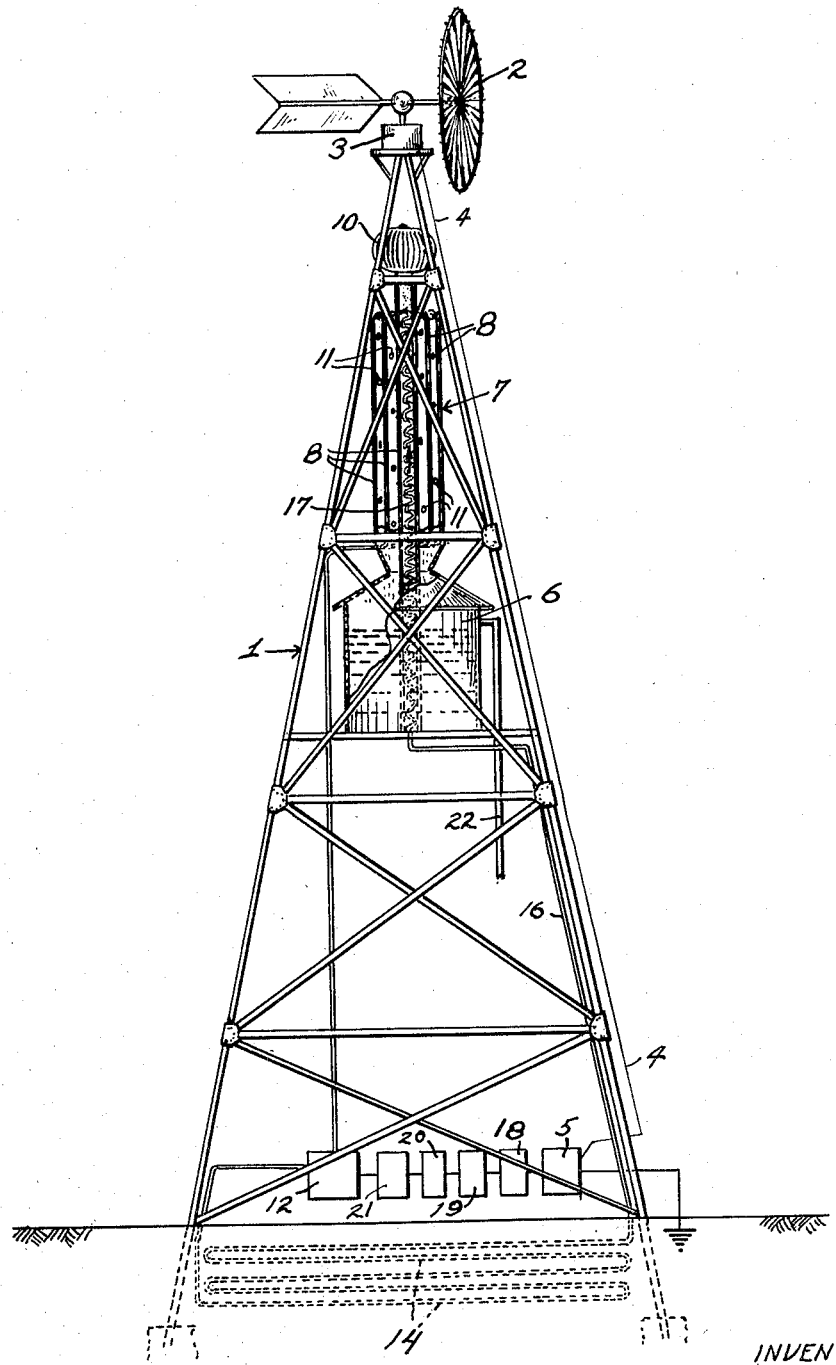

2,805,560
METHOD AND APPARATUS FOR CONDENSING MOISTURE

George Beresford, Columbia, Calif.

Application April 2, 1956, Serial No. 575,579

1 Claim. (Cl. 62—140)

This invention relates to an apparatus for and method of collecting moisture from the atmosphere.

It is among the objects of the invention to provide an apparatus and method by which moisture may be condensed from the air and directed to useful purposes.

It is also an object of this invention to provide an apparatus whereby atmospheric moisture may be collected from a moving stream of air by a condensing system actuated by power derived from the flow of the air past a windmill.

Another object is to provide an apparatus whereby electrical energy generated by the operation of a windmill is stored and utilized for actuating a refrigerating system operable for condensing moisture from the air.

A further object is to provide a system for condensing and collecting atmospheric moisture wherein wind power is utilized for actuating a generator which in turn actuates a refrigerating system to circulate a refrigerant through sets of heat exchange coils mounted underground and or in a water storage tank for delivery through chilling coils mounted in association with a condenser.

A still further object is to provide an apparatus for collecting atmospheric moisture which will operate through long periods of time with a minimum of operating cost and attention.

These and other objects are accomplished by means of the apparatus illustrated in the drawings forming a part of the present specification.

In the drawing, the figure is a schematic elevational view illustrating an apparatus constructed and operating in accordance with the invention.

In the drawings, the numeral 1 designates in general a tower upon the top of which is mounted a windmill 2 of conventional form and construction. The windmill 2 is arranged to actuate an electric generator 3 by which wind power is converted to electrical energy, which may be directed through a suitable conductor 4 to a set of storage batteries 5.

A water storage tank 6 is mounted in an elevated position upon the tower 1 to receive and collect moisture from a condenser 7 mounted above the tank and arranged to cause moisture condensed thereby to flow into the tank. As illustrated, the condenser includes a plurality of condenser plates 8 preferably forming a tubular casing through which a current of air is directed by a revolving ventilator 10. The plates 8 are chilled by means of cooling tubes or coils 11 mounted in association therewith and forming part of a refrigerating system operable to cool air flowing, for the distinctive purpose of the invention, through the condenser to a temperature below the dew point, so that moisture contained in the air will condense and drain into the tank 6.

The refrigerating system comprises a pump 12 operable to pump refrigerant through a set of heat exchange coils 14, preferably mounted underground below the tower 1, and connected by a pipe 16 to a coil 17 extending upwardly through the tank 6 and condenser 7. Refrigerant from the pump 12 is cooled as it passes through the coils 14 and 17, and its expansion in the cooling coils 11 chills the plates 8. The pump 12 is actuated by means of a motor 18 which is energized by electric power drawn from the storage batteries 5. The system may include suitable regulating and control means such as a thermostatic control, a humidity control, a hydraulic pump, hydraulic motor and hydraulic accumulator, and other devices of desired character, as indicated diagramatically at stations 19, 20 and 21. Since such units are of conventional construction, and their operation is well known, a detailed explanation thereof is unnecessary in the present application.

In operation, the generator 3 is actuated by the windmill 2 to generate electricity for charging the storage batteries 5. The motor 18 is energized by electrical energy drawn from the batteries 5 to actuate the refrigerant pump 12, directly or through desired accessories and controls 19, 20 and 21. The pump 12 operates to compress refrigerant and circulate it through the ground coils 14 and tank coils 17 for expansion in the cooling coils 11, thereby chilling the condenser plates 8. At the same time, a current of air is directed downwardly by the ventilator 10 past the cooling plates 8. This flow of air is cooled to a point below the dew point, and the atmospheric moisture condenses on the surfaces of the plates 8 and drains into the tank 6. As the tank is filled, the collected water aids in cooling the refrigerant. Overflow from the tank is delivered by gravity through an overflow pipe 22 to a desired point of use.

Once installed, the device operates on power derived from the wind with substantially no cost for its upkeep, and with a minimum of care and servicing. The device is especially useful in arid sections where even at low humidity, the moisture content of the air may be condensed and collected for use for households, livestock, irrigation or other purposes.

It is to be understood that the form of my invention herewith shown and described and the method employed are to be taken as the preferred forms of the invention and that various changes relative to the material, size, shape and arrangement of parts may be resorted to without departing from the spirit of the invention or the scope of the subjoined claim.

Having thus described my invention, what I claim is:

An apparatus for collecting atmospheric moisture which comprises a tower, a windmill upon the tower, an electric generator actuated by the windmill, a condenser mounted in elevated position upon the tower for directing a current of air through the condenser, a tank mounted in elevated position upon the tower arranged to receive condensate from the condenser, a refrigerating system having interconnected sets of heat transfer coils positioned underground and in the tank and provided with chilling coils associated with the condenser, a pump for circulating refrigerant through the refrigerating system, and means energized by the generator for actuating the pump.

References Cited in the file of this patent

UNITED STATES PATENTS 2,539,862  Rushing _____ Jan. 30, 1951

FOREIGN PATENTS 272,668  Italy _____ Mar. 17, 1930